United States Patent [19]

Henderson

[11] Patent Number: 4,832,722
[45] Date of Patent: May 23, 1989

[54] METHOD OF MANUFACTURING FLEXIBLE OPTICAL FIBER BUNDLES

[75] Inventor: William Henderson, Glasgow, Scotland

[73] Assignee: Barr & Stroud Limited, Glasgow, Scotland

[21] Appl. No.: 90,406

[22] Filed: Aug. 27, 1987

Related U.S. Application Data

[63] Continuation of Ser. No. 831,386, Feb. 20, 1986, abandoned.

[30] Foreign Application Priority Data

Feb. 21, 1985 [GB] United Kingdom ............... 8504535

[51] Int. Cl.$^4$ .................. C03C 13/04; C03C 25/06; C03B 37/023
[52] U.S. Cl. ........................ 65/3.15; 65/4.2; 65/31; 65/35; 156/663
[58] Field of Search ............ 65/3.15, 4.2, 4.21, 65/31, 35; 156/168, 663

[56] References Cited

U.S. PATENT DOCUMENTS

| | | | |
|---|---|---|---|
| 3,830,667 | 8/1974 | Carpenter | 156/168 X |
| 3,981,706 | 9/1976 | Strack | 65/3.15 |
| 4,112,170 | 9/1978 | Rauscher | 156/663 X |
| 4,373,944 | 2/1983 | Glick et al. | 65/35 |
| 4,389,089 | 6/1983 | Strack | 65/3.15 |
| 4,453,962 | 6/1984 | Harada et al. | 65/3.15 |

FOREIGN PATENT DOCUMENTS 1060973 3/1967 United Kingdom ............... 65/35

Primary Examiner—Robert L. Lindsay
Attorney, Agent, or Firm—Pennie & Edmonds

[57] ABSTRACT

Flexible coherent optical glass fiber bundles are manufactured from rigid coherent optical glass fiber bundles by selecting the fiber bonding agent to be an acid-leachable glass having a silica content in the range 8–15% molecular and removing acid-leachable glass from the rigid bundle by immersion of the bundle in a mineral acid leaching solution having a concentration in the range 5–30% by volume.

6 Claims, 2 Drawing Sheets

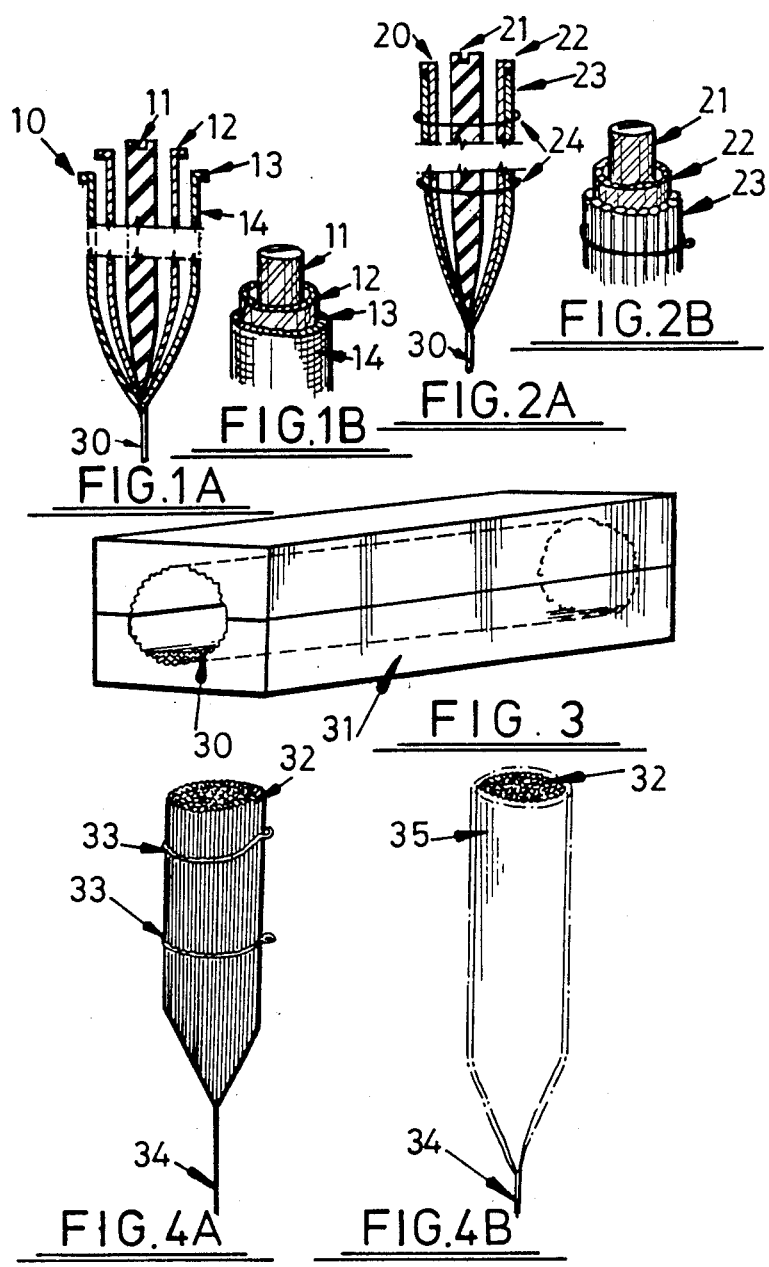

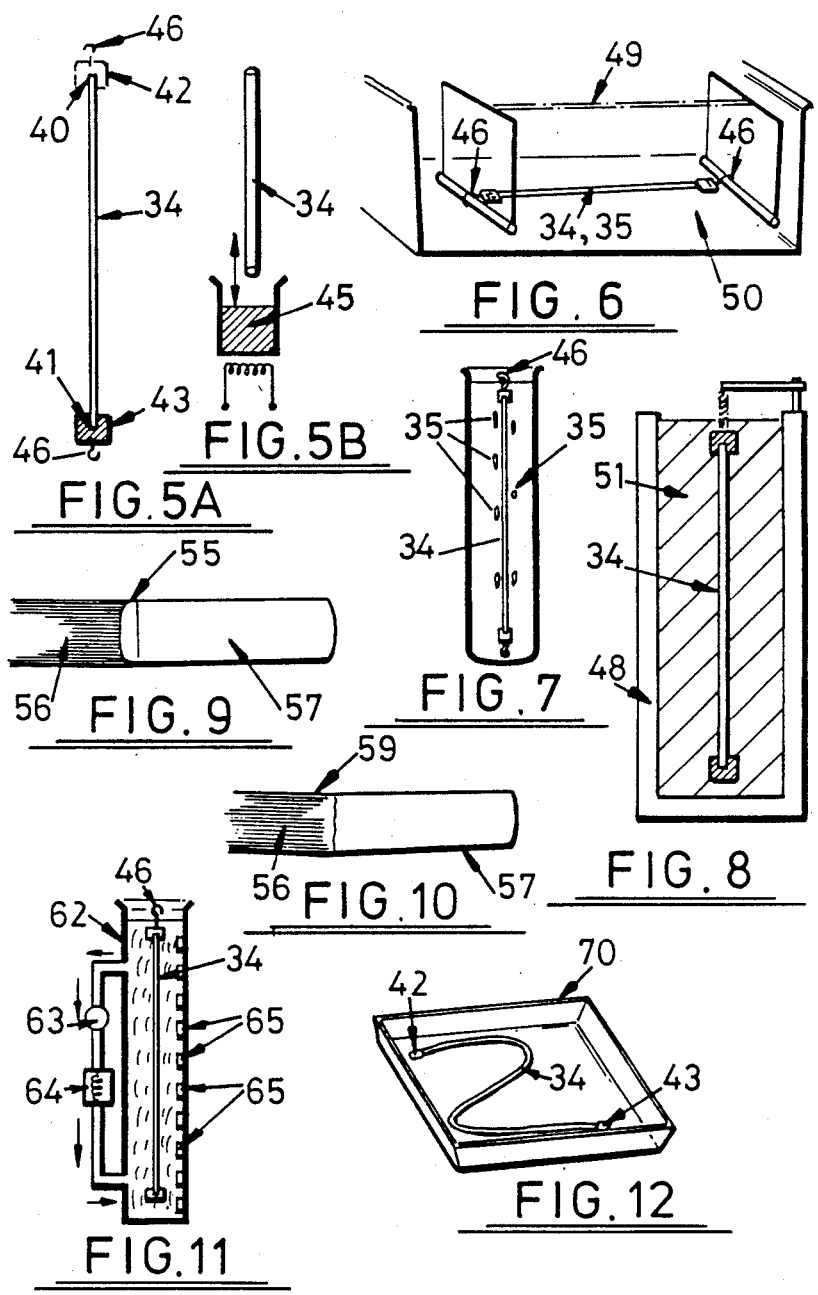

METHOD OF MANUFACTURING FLEXIBLE OPTICAL FIBER BUNDLES

This is a continuation of application Ser. No. 831,386, filed Feb. 20, 1986 now abandoned.

This invention relates to flexible coherent optical glass fibre bundles, and to methods of manufacture thereof.

Flexible coherent optical glass fibre bundles are already well known and comprise a plurality of individual optical glass fibres extending in side-by-side relationship when the bundle is fully extended, the ordering of the fibre ends at one end face of the bundle having a predetermined relationship to the ordering of the fibre ends at the other end face of the bundle, and only adjacent each end face of the bundle are the individual fibres bonded together in a rigid manner.

In order to manufacture the known forms of flexible coherent optical glass fibre bundles a coherent optical glass fibre bundle which is rigid throughout its length is first formed utilising as an inter-fibre bonding agent a material which is selectively leachable, the ends of the rigid bundle are then provided with a protective coating which is impervious to a leaching agent and the rigid bundle is subjected to the leaching agent. The leaching agent removes, by dissolution, the bonding agent throughout the length of the bundle except at the protective coatings to thereby render the bundle flexible.

Conventional bonding agents are silica-free borate glasses i.e. glasses having only a trivial quantity, of the order of 1% or less, of silica content and these have been chosen hitherto because silica is insoluble in the conventional leaching agent (hydrochloric acid) and therefore, if present, tends to remain as an abrasive between the fibres, which gives rise to fibre breakages.

Bundles produced using such silica free glasses as the bonding agent incorporate a cone-shape transitional zone between the flexible and rigid sections of the bundle which in itself gives rise to fibre breakage during use of the bundle, and it is believed that this arises because the cone shape of the transitional region is relatively weak. To overcome this problem previous proposals have utilised additional sheathing for the bundle or an excessively long end piece or ferrule but these arrangements both detract from the desired degree of flexibility of the bundle.

It has now been discovered that by deliberately including a substantial silica content within the bonding agent, the insoluble silica products formed during leaching serve to control the rate of dissolution of the bonding agent and that a planar profile transitional zone can be established which enables the rigid end portions of the bundle to be shorter than hitherto giving rise to improved flexibility of the bundle, whilst the insoluble silica products can be removed from the bundle after the leaching process so that durability of the bundle is maintained at the same level or greater than hitherto.

According to the present invention there is provided a method of manufacturing a flexible coherent optical glass fibre bundle, said method including the steps of forming a rigid coherent optical glass fibre bundle wherein the individual fibres are bonded together by a bonding agent in the form of an acid-leachable glass having a silica content in the range 8–15% (molecular), removing the acid-leachable glass from the rigid bundle by immersing the rigid bundle within a bath containing a leaching solution of mineral acid having a concentration in the range 5–30% by volume, and subsequent to said removing step neutralising leaching solution adherent to the bundle, and cleaning the bundle of adherent silica products.

By virtue of the present invention it has been found that the aforesaid planar profile transitional zone is established and the resultant flexible bundle is free of abrasive silica products.

Preferably the leaching solution is maintained at a temperature of 20° C. and has a concentration of 20% by volume. The leaching solution may be hydrochloric or nitric acid.

Preferably also the rigid bundle is totally immersed in the bath in a vertical orientation.

Preferably cleaning the bundle of adherent silica products is effected by immersion of the flexible bundle within an ultrasonic bath through which deionised water is circulated via a particle-removing filter. Conveniently the bundle is vertically disposed within the ultrasonic bath and the ultrasonic waves impinge laterally upon the entire length of the bundle.

Conveniently the bonding agent is formed by any one of the glasses itemised in Table I.

Conveniently the rigid fibre bundle is formed of individual fibres each consisting of a core surrounded by an optical cladding surrounded by a carrier which is externally coated with said acid-leachable glass. With this arrangement the quantum of acid-leachable glass can be the minimum necessary to effect bonding and efficient leaching whilst the carrier provides a protective barrier to attack by the acidic leaching solution on the optical cladding. Also, the carrier provides a volume of glass into which bubbles(which may be formed during drawing of the rigid bundle)can disperse without adversely affecting the optical quality of the core and its cladding. Conveniently the carrier is a glass of lower refractive index than the optical cladding whereby the optical quality of the core and its cladding is enhanced.

Conveniently the carrier is formed by a glass having the composition itemised in Table II.

It will be understood that in order to manufacture the rigid fibre bundle individual fibres are first drawn to a predetermined diameter from a starting assembly of components, the resultant fibres are then assembled to form an oversized bundle which is further drawn in one or more stages to the finally required diameter. Consequently where a carrier is utilised as described above, this in the starting assembly takes the form of a tube. In an alternative manufacturing process the starting assembly for each fibre comprises a core rod surrounded by an optical cladding surrounded by a plurality of leachable-glass rods sufficient in number to form a tube-like assembly around the optical cladding, each such rod having a silica content in the range 8–15% (molecular). This arrangement has the advantage that the thickness of leachable glass bonding agent can be selected by varying the diameter of the individual rods of the starting assembly, which is relatively easy, and glass in rod form is more readily manufactured to high purity levels than glass in tubular form so that unwanted inclusions in the bonding agent are more readily eliminated. It will be understood that such inclusions, if present, may give rise to blemishes within the bundle caused by constricted fibres.

The multiple assembly of oversized fibres may be housed in an outer glass sleeve prior to being drawn to the required diameter or the assembly may simply be harnessed together so that fibre-to-fibre bonding takes place during the subsequent drawing process. In the event that an outer glass sleeve is utilised it is preferably of the soda-glass type internally lined with a sacrificial layer of leachable glass and prior to the removing step of the present invention the outer glass sleeve, or at least the soda glass content thereof, is removed by a hydrofluoric acid etch.

Embodiments of the present invention will now be described by way of example with reference to the accompanying drawings:

FIGS. 1A and 1B illustrate a first starting assembly of components for forming a coherent optical glass fibre bundle;

FIGS. 2A and 2B illustrate a second starting assembly of components;

FIGS. 3 to 7 illustrate sequential steps in manufacturing a rigid coherent optical glass fibre bundle;

FIG. 8 illustrates a leaching process used in accordance with the present invention for converting a rigid bundle to a flexible bundle;

FIG. 9 illustrates a detail of a flexible bundle when manufactured according to the present invention;

FIG. 10 illustrates the comparable detail of a flexible bundle when manufactured in accordance with prior techniques;

FIG. 11 illustrates a process for cleaning insoluble products of the leaching process from the flexible fibre bundle; and FIG. 12 illustrates a bundle-cleaning process.

In the drawings FIGS. 1A and 1B illustrate a first starting assembly 10 of components in the form of a core rod 11 surrounded by an optical cladding tube 12 surrounded by a carrier tube 13 supporting on its outer surface a covering layer 14 of acid-leachable glass. Heat is applied to a confined portion of the assembly 10 until the components soften sufficiently to enable the assembly to be pulled through a nip-roller assembly in a manner known per se so as to form an oversized fibre having a diameter in the range 150 to 400 microns. As is known, vacuum is applied to the upper end of the assembly 10 during the drawing process to avoid entrapment of air.

FIGS. 2A and 2B illustrate a second starting assembly 20 of components in the form of a core rod 21 surrounded by an optical cladding tube 22 surrounded by a plurality of leachable-glass rods 23 sufficient in number to form a tube-like assembly around cladding tube 22, the rods 23 being held in place by a wire harness 24. An oversized fibre is drawn from assembly 20 in the same manner as explained in relation to assembly 10.

Lengths of the oversized fibres 30 produced from one of the assemblies 10, 20, conveniently 1m in length are cleaned then assembled side by side within a jig 31 (FIG. 3) designed to create the ideal packing configuration of close-hexagonal packing and the bundle 32 so created is circumferentially bound with a wire harness 33 (FIG. 4A) to enable the bundle 32 to be heated and drawn into a fused multifibre bundle 34 typically of diameter 2.3 mm. It will be appreciated that jig 31 facilitates ordering of the fibre ends at each end of the jig 31 so that in the multifibre bundle the fibres are parallel to each other.

As an alternative to use of a wire harness 33 the bundle 32 may be packed into a sacrificial glass sleeve 35 (FIG. 4B).

In order to clean the lengths of oversized fibres 30 it is preferred to place a collection of these fibres 30, supported by an open wire cradle, in a bath of isopropyl alcohol of Analar grade and to vibrate the bath ultrasonically at a frequency of 40 KHz. This may be repeated several times with fresh alcohol, the final clean being made using isopropyl alcohol of Aristar grade (which is of greater purity than Analar grade). The cleaned fibres 30 are then dried in a warm clean atmosphere prior to being assembled to form bundle 32. In order to provide bundle 32 with greatest packing density and optical coherence with minimum fibre constriction it is preferred that jig 31 or sleeve 35 be mounted horizontally on a vibratory table vibrating at a frequency between 50 and 100 Hz and about 3 mm amplitude so that as the individual lengths of fibres 30 settle further fibres 30 can be added until such time as jig 31 or sleeve 35 is fully filled. End alignment of the filled jig 31 or sleeve 35 is effected by mounting the jig or sleeve vertically on the vibratory table. It is preferred that the jig 31 or sleeve 35 is itself cleaned prior to being loaded with fibres 30 and that such cleaning be the same as is applied to the fibres 30.

The fused multifibre bundle 34 is a rigid bundle and is cut into lengths in order to form a flexible bundle as will now be explained. Thus, the ends 40, 41, of the rigid bundle are optically ground and polished and respectively provided with a coating 42, 43 of wax or other convenient acid-resistant material (FIG. 5A) prior to the rigid bundle 34 being rendered flexible. It is preferred that this waxing process be effected as shown in FIG. 5B whereby one bundle end at a time is dipped into a hot wax bath 45 by a predetermined distance with the bundle 34 in a vertical orientation so that a wax cylinder 42, 43, is formed adherent to the bundle 34. A metal hook 46 is attached to the cylindrical coating 42, 43, at at least one end of the bundle depending upon whether the bundle 34 was formed by the FIG. 4A or FIG. 4B arrangement. In the event of the FIG. 4B arrangement two end hooks 46 are required for the purpose of removing the glass sleeve 35 in a bath of hydrofluoric acid as depicted in FIG. 6.

As is shown in FIG. 6 the bundle 34 is supported by end hooks 46 on a cradle 49 so that the bundle 34 assumes a horizontal orientation within the hydrofluoric acid bath 50 without any part of the bundle 34 contacting the walls (or floor) of the bath 50. The bath 50 typically contains 50% by volume hydrofluoric acid in deionised water which for a soda glass sleeve 35 produces a typical etch rate of 3 to 5 microns per minute with the bath at ambient temperature (20° C.). When this etching process is completed the cradle 49 is removed to a bath containing deionised water wherein the bundle 34 is flushed until the pH returns to neutral (i.e. pH7). Thereafter, to remove any remaining portion of the sleeve 35 the bundle 34 is suspended vertically as shown in FIG. 7 within a bath containing 20% by volume hydrochloric acid in deionised water at a temperature of 20° C. typically for about 2 minutes. The bundle 34 is then removed, dried and the ends are re-waxed as previously described, possibly with a small increase in length of the wax cylinder of the order of 0.5 mm to obtain a clean circular profile at the end of the wax.

It will be appreciated that if the bundle 34 was formed by the FIG. 4A arrangement, no glass sleeve 35 is present and therefore the process described with reference to FIG. 6 and FIG. 7 is not relevant.

In order to render the rigid bundle 34 flexible at least one leaching process is undertaken in order to remove or leach out the acid-soluble bonding glass from between the optical fibres. Primarily, and in accordance with the present invention, the rigid bundle is vertically immersed within an agitation-free bath 48 (FIG. 8) containing a leaching solution 51 of hydrochloric acid at ambient temperature. The concentration of the leaching solution 51 is within the range 5–30% by volume acid to deionised water. The duration of this leaching process is determined on a test bundle and is sufficient to remove substantially all of the leachable bonding glass within the fibre bundle 34 and in so doing produces a planar profile transition 55 as shown in FIG. 9 between the flexible portion 56 and the rigid portion 57 of the bundle as compared with the cone-shaped profile 59 shown in FIG. 10 resulting from prior leaching processes. It has been found that when the silica content of the bonding glass is less than 8% a cone profile 59 tends to be formed whereas with a silica content of more than 15% the silica products formed during leaching reduce permeability of the leaching solution through the bundle 34 and give rise to substantially increased leaching times which expose the fibres towards the outside of the bundle to the leaching solution for too long a period resulting in these fibres being weakened and therefore readily broken.

Following the leaching process referred to above the bundle 34 is immersed, vertically, in a bath of deionised water which is circulated and replenished until a neutral solution is achieved (at pH 7).

In order to remove insoluble products, such as silica residues, trapped between the flexible fibres of the bundle 34, the bundle 34 is transferred to an ultrasonic agitation bath 62 shown in FIG. 11 through which deionised water is circulated by a pump 63 via a filter bank 64 capable of removing particles in excess of 1 micron in size. Typically a water flow rate of 150 gallons per hour is used and the bath 62 is provided along one vertical wall with a plurality of ultrasonic transducers 65 arranged to direct ultrasonic waves so as to impinge laterally along the length of the bundle 34 which is vertically suspended. With this arrangement insoluble products are vibrated out of the bundle 34 and collected by the filter bank 64. A typical duration for this process is 16–20 hours, at the end of which time the bundle 34 is substantially free of insoluble products of the leaching process.

At this stage the flexible bundle 34 still retains its end cylinders of wax 42,43 and in order to remove these the bundle 34 is transferred to a bath of iso-propyl alcohol where it is initially rinsed for a short period (several minutes only) before being transferred to a further iso-propyl alcohol bath in which it is soaked for about 30 minutes in order to render the wax 42,43 soft. Conveniently in both baths 70 (FIG. 12) the bundle 34 is laid horizontally. When the wax 42,43 is soft it is manually removed by peeling and trace quantities of the wax remaining adherent to the bundle 34 are removed by further soaking in a clean iso-propyl alcohol bath. Thereafter the bundle 34 is left to dry in a clean filtered air stream prior to being lubricated, externally sheathed and polished in conventional manner.

By way of example typical materials which may be used to manufacture flexible glass fibre bundles in accordance with the present invention are:

Fibre core 11,21 may be made of Flint Glass Type F7 marketed by Schott;

Optical cladding 12,22 may be made of Crown Glass S95 marketed by Schott;

leachable glass rods 23 or coating 14 may be Barium Alumino Borate or Calcium Alumino Borate compositions as specified in Table I herein.

TABLE I

| Composition | Glass 1 % Molecular | Glass 2 % Molecular | Glass 3 % Molecular |
|---|---|---|---|
| $SiO_2$ | 12.3 | 14.1 | 8.4 |
| $Al_2O_3$ | 12.7 | 17.5 | 17.3 |
| $B_2O_3$ | 49.3 | 45.0 | 23.1 |
| BaO | — | — | 34.1 |
| CaO | 6.3 | 9.1 | 17.1 |
| $Na_2O$ | 19.6 | 14.3 | — |

TABLE II

| (Type of Glass - Alkali barium silicate) | |
|---|---|
| Composition | (Wt %) |
| $SiO_2$ | 67% |
| $Al_2O_3$ | 0.5% |
| $B_2O_3$ | 2.7% |
| BaO | 15.2% |
| CaO | 0.5% |
| $Na_2O$ | 6.7% |
| $K_2O$ | 7.0% |

I claim:

1. A method of manufacturing a flexible coherent optical glass fibre bundle, said method including the steps of
   (a) forming a starting assembly comprising a glass core rod surrounded by an optical cladding surrounded by bonding agent, the bonding agent being an acid-leachable glass having a silica content in the range 8–15% (molecular);
   (b) zone heating and drawing the starting assembly to provide an oversize rigid fibre with a coating of said bonding agent;
   (c) cutting the oversize rigid fibre into predetermined lengths and bundling a plurality of said lengths together with optical coherence between the end faces of the bundle;
   (d) zone heating and drawing the bundle to form a rigid coherent multifibre bundle wherein the individual fibres are bonded together by said bonding agent;
   (e) cutting the rigid multifibre bundle into predetermined lengths and processing at least one of said lengths to form a flexible coherent optical glass fibre bundle by
      coating the ends of the length with an acid-resistant material,
      immersing the end-coated length in a bath containing a mineral acid leaching solution having a concentration in the range 5–30% by volume so as to remove the acid leachable glass bonding agent from the uncoated parts of the length and thereby render the length flexible, and
      subsequently neutralizing leaching solution adherent to the flexible bundle and cleaning the flexible bundle of adherent silica products.

2. The methodd as claimed in claim 1, wherein the leaching solution is maintained at a temperature of 20° C. and has a concentration of 20% by volume.

3. The method as claimed in claim 2 wherein the rigid bundle is totally immersed in the bath in a vertical orientation.

4. The method as claimed in claim 3 wherein cleaning the flexible bundle of adherent silica products is effected by immersion of the flexible bundle in an ultrasonic bath through which deionized water is circulated via a particle-removing filter.

5. The method as claimed in claim 4, wherein the flexible bundle is vertically disposed within the ultrasonic bath and the ultrasonic waves impinge laterally upon the entire length of the bundle.

6. The method as claimed in claim 5, wherein the bonding agent is formed by glass with one of the following molecular compositions:
   (a) 12.3% $SiO_2$, 12.7% $Al_2O_3$, 49.3% $B_2O_3$, 6.3% CaO, 19.6% $Na_2O$;
   (b) 14.1% $SiO_2$, 17.5% $Al_2O_3$, 45.0% $B_2O_3$, 9.1% CaO, 14.3% $Na_2O$; or
   (c) 8.4% $SiO_2$, 17.3% $Al_2O_3$, 23.1% $B_2O_3$, 34.1% BaO, 17.1 CaO.

* * * * *